United States Patent [19]

Galmiche et al.

[11] 3,900,613

[45] Aug. 19, 1975

[54] PRODUCTION OF SURFACE DIFFUSION ALLOYS

[75] Inventors: Philippe Marie Galmiche, Clamart; Andre Hivert, Pontoise, both of France

[73] Assignee: Office National d'Etudes et de Recherches Aerospatiales (O.N.E.R.A.), France

[22] Filed: June 25, 1973

[21] Appl. No.: 373,097

[30] Foreign Application Priority Data

June 30, 1972 France .............................. 72.23871

[52] U.S. Cl. .................. 427/237; 427/239; 427/252
[51] Int. Cl.² ........................ C23C 9/00; C23C 9/02
[58] Field of Search ........... 117/107.2 P, 97, DIG. 8

[56] References Cited

UNITED STATES PATENTS

| | | | |
|---|---|---|---|
| 1,867,837 | 7/1932 | Jackson | 117/DIG. 8 X |
| 2,657,668 | 11/1953 | Maier | 117/DIG. 8 X |
| 2,987,416 | 6/1961 | Wessel | 117/DIG. 8 X |
| 3,038,823 | 6/1962 | Currant et al. | 117/DIG. 8 X |

*Primary Examiner*—Ralph S. Kendall
*Assistant Examiner*—Harris A. Pitlick
*Attorney, Agent, or Firm*—Larson, Taylor and Hinds

[57] ABSTRACT

A metal called "application metal" is applied to the inner wall of a metallic hollow part, especially a metallic hollow part whose inner cavity has oblong or curved zones difficult to reach by a powder or pastry material. A heat treatment utilises a cement placed in the inner cavity of the treated part and in immediate proximity to the walls of said cavity, this cement comprising, among other constituents, a powder of the one or more application metals, an inert diluent with a high heat of formation, and a halogen or halogenated compound. The cement also contains a solution of a surface active agent adapted to confer thixotropic properties on the mixture formed by the initial constituents of the cement and by the solution. It is subjected to vibration during its introduction into the cavity and is then left undisturbed until it resumes its initial viscosity. The hollow part thus lined with cement is subjected to the heat diffusion treatment proper and, once this heat diffusion treatment is terminated, the cement is removed.

18 Claims, No Drawings

PRODUCTION OF SURFACE DIFFUSION ALLOYS

The invention relates to methods for the formation of surface diffusion alloys, by application of at least one metal called "application metal", to the inner wall of metallic hollow parts and especially of metallic hollow parts constituted, in the whole of their mass or at least superficially on the side of their inner wall, at least one metal of the group constituted by iron, nickel, cobalt, tungsten and molybdenum, with possibly the addition of one or several addition metals such as chromium, titanium, aluminum, zirconium, etc.

As for the application metals which are usable in a method according to the invention, they are metals capable of conferring on the treated surfaces an increased resistance to dry or wet corrosion, or even to wear without corrosion, such metals being possibly chromium, aluminum, tantalum, titanium, zirconium, vanadium, boron, it being understood that, when the method involves several application metals, the alloys of the metals enumerated above constitute particularly advantageous application alloys.

The invention relates also to hollow parts of the type concerned whose inner wall is treated by a method according to the invention, and it relates more particularly again, but not exclusively, among these hollow parts, to those whose inner cavity has oblong or curved zones difficult of access to a powder or pasty filler material, which is the case, especially, for tubes of small diameter, long and fine bores, sheaths bounded by walls of slight separation, etc...

It seems opportune, at this point of the description, to specify that the methods of the type concerned imply the application of a reactive mass, qualified by "cement" specialists as containing essentially: the one or more application metals in the form of powder (this powder being possibly an alloy powder when there are several application metals); an inert diluent with a high heat of formation intended to avoid, in the treatment, the coalescence or sintering of the constituent particles of the abovesaid metal or alloy powder; and a halogen or halogenated compound intended to generate vapors suitable for carrying the one or more application metals (in the form of halide of this one or more application metals) from the metallic particles contained in the cement to the surfaces to be treated, the flow of the abovesaid vapors being facilitated by the presence of interstices formed in the cement by the inert diluent particles and their regeneration being ensured by the presence of a hydrogenated atmosphere.

Such methods imply, in order to give satisfactory results as to the quality and homogeneity of the treated surfaces, that the cement be at all points in immediate proximity, even in contact, with the surfaces to be treated of the parts.

Now, where hollow parts are concerned and especially parts whose internal cavity is difficult to reach, it will be understood that it was difficult, even impossible in the absence of special precautions, to cause a conventional cement to penetrate into the most remote zones of the abovesaid cavity, due to the fact that such a cement hitherto was in a powder or paste form.

Hence there resulted, until now, an imperfection of the inner surfaces of the hollow parts treated with a conventional cement incapable of filling in a regular and homogenous manner the inner cavity of such parts, especially when said cavity had oblong or incurved zones difficult of access.

It is a particular object of the invention to provide a method of the type concerned not having the drawbacks recalled above, that is to say a method of forming a surface diffusion alloy, for the treatment of the inner wall of hollow parts, applying a cement capable, on its application, of penetrating right into the most remote zones of the inner cavity of the abovesaid hollow parts.

It seems judicious, before discussing the essential characteristic of the invention and to make clearer the statement of this characteristic and the advantages which flow therefrom, to briefly recall what is understood, from the physical point of view, by the expression "phenomenon of thixotropy". There is involved here a reversable phenomenon to which certain very viscous products are subject (especially pastes or gels) which are provisionally liquefied under the effect of vibration and then resume their initial viscosity after a certain lapse of time in resting condition.

The method according to the invention, for the formation of surface diffusion alloys on the inner wall of hollow metallic parts, especially based on at least one metal of the group constituted by iron, nickel, cobalt, tungsten and molybdenum (with possibly the addition of addition metals), comprises a heat treatment in a hydrogenated atmosphere applying a cement placed in the inner cavity of the abovesaid parts and in immediate proximity to the walls of said cavity, this cement comprising, among other elements, a powder of the one or more application metals (chromium, aluminum, tantalum, titanium, zirconium, especially), an inert diluent with a high heat of formation, and a halogen or halogenated compound, the abovesaid method being characterised in that, on the one hand, the abovesaid cement contains in addition a surface active agent in solution in a liquid conferring thixotropic properties on the mixture formed by the initial constituents of the cement and the surface active agent in solution added to these initial constituents, on the other hand, the cement thus constituted as subjected to vibration on its introduction into the cavity of the hollow parts to be treated, said cement the undergoing liquefaction rendering it adapted to occupy the whole of the abovesaid cavity including its zones which are most withdrawn and most difficult of access, on the other hand again, the cement having thus filled the cavity of the hollow parts in the liquid state is left at rest, so that this cement resumes its initial consistency, after which there follows, if necessary, the elimination of the solvent of the surface active agent when the presence of this solvent shows itself to be detrimental, on subsequent heat diffusion treatment, to the surface state of the treated walls, and, on the other hand lastly, the heat diffusion treatment proper is carried out, after which removal of the cement lining the cavity of the hollow parts which have just been internally treated, is carried out.

Due to such a method and due to the fact that the cement used lines the whole of the cavity of the treated hollow parts in homogenous manner and comprises the active elements in sufficient concentration, satisfactory and regular quality of the alloy formed on the wall of the abovesaid cavity is obtained, over the whole extent of said wall, including here its most withdrawn zones.

Then as regards the cement used, its production comprises a first phase consisting of mixing intimately particles of the various constituents provided, with the exception of the surface active agent which has to confer on the final cement its thixotropic character.

This first phase can be carried out in any suitable manner and especially and in manner known in itself (O.N.E.R.A. methods for the formation of surface diffusion alloys), by using a fine powder (several microns) or ultrafine (of the order of a micron) of the one or more application metals provided, or of an alloy of several application metals, by adopting a high proportion by volume of an inert diluent with a high heat of formation soluble in certain acids, this inert diluent being preferably an oxide of an alkaline earth metal, such as especially, beryllium oxide (BeO), calcium oxide (CaO), barium oxide (BaO) or even better, magnesium oxide (MgO) cheaper and less heavy than barium oxide and less subject to carbonation than calcium oxide and beryllium oxide (this latter oxide having besides the drawback of being toxic), and by selecting a halogenated compound adapted to release, besides the corresponding halogen, the hydrogen necessary for the transport mechanism of the application metal in halogenated gaseous phase (hydrogen being able to take part with difficulty from the outside of the hollow part once the cement is in position) the abovesaid compound being preferably an ammonium halide.

Then as regards the surface active agent which has to be incorporated, in the form of solution, with the foregoing constituents to obtain the final thixotropic cement, there are preferably adopted, as solvent, an aliphatic or aromatic hydrocarbon, or an absolute alcohol, whose boiling point is preferably located between 80° and 120°C, since, below 80°C, the excessive volatility risks causing the viscosity of the paste in the course handling to vary by evaporation, and, above 120°C, difficulties can arise in the subsequent phase of eliminating the suspending liquid, and, as surface active agent proper, an acid having an ethylenic double bond such as an acid of the oleic, linoleic and ricinoleic groups.

It should be noted that, when the apparatus used for the mixing and the grinding of the initial constituents of the cement (metallic particles, inert diluent and halogenated compound) can receive also, without risk of attack of its essential parts, the solution of surface active agent, this solution will be introducable into said apparatus at the same operation stage as the abovesaid initial constituents; the mixing and grinding operation effected by means of the apparatus concerned enables the obtaining directly of the desired thixotropic cement ready for use.

Then as regards the introduction of the thixotropic cement into the hollow part, it is effected by placing said part on a vibrating table whose rate of vibration is adapted to ensure the provisional liquefaction of said cement and thereby causing the latter to penetrate into the cavity of the part, either by simple gravity flow if the configuration of the part permits it, or by injection, in the contrary case.

Due to the liquefaction generated by the vibrations, the cement penetrates right into the remotest part of the cavity of the part, after which said part is separated from the vibrating table and left to stand, which enables the cement to resume its initial viscosity and then to remain in place, whatever the subsequent handling undergone by the part thus lined with the treating cement.

Although it is possible, in certain cases, to envisage leaving in the cement, the solvent of the surface active agent (especially if this solvent does not risk altering the atmosphere of the diffusion treatment proper to unacceptable proportions), it would generally be advantageous and often even indispensable, once the thixotropic cement returns to its initial viscosity in the cavity of the part, to remove the solvent of the surface active agent since said solvent is generally a carbonised product capable of generating, at temperatures utilised for the diffusion operation proper, compounds poisoning the active atmosphere carrying the one or more application metals from the metallic particles of the cement to the surfaces to be treated.

This removal of the solvent of the surface active agent is advantageously effected by subjecting the hollow part lined internally with the thixotropic cement to stoving, this stoving being preferably conducted at two successive times, namely, the first time at a temperature below the boiling point of the solvent to be removed, said solvent then evaporating, to a great extent, slowly and without forming bubbles, the second time at a temperature above the boiling point of the solvent of which the last traces are thus eliminated.

By proceeding thus boiling of the cement is avoided which would risk causing disturbance of good filling of the cavity of the treated part and causing local separations, even pockets where the reactive mass would occur separated from the wall to be treated, such phenomena being obviously objectionable for the heat diffusion treatment proper which has to take place following this solvent removal.

Then as regards the heat diffusion treatment proper, its own features do not come within the scope of the invention and, it can be conducted in any suitable way and especially under the recommended conditions for similar diffusion treatments regarding the formation of surface diffusion alloys on outer walls of parts having the compositions envisaged in the introduction of the present description and with application metals also envisaged in this introduction.

Of course, the features of this heat diffusion treatment depends, among other factors, on the composition of the treated part, on the exact nature of the one or more application metals and on the intrinsic characteristics of the layer of diffusion alloy to be formed on the inner wall bounding the cavity of the treated hollow part.

Where a chromaluminisation treatment is concerned recourse will advantageously be had to all or part of the features described in French patent 70-21-934 of applicant.

It will be noted in this regard that the medium in which the parts to be treated are placed can be very different from the cement of the invention, and that its nature will be selected as a function of the treatment that it is desired to submit to the outer walls of the treated parts at the same time as the diffusion treatment of the invention applied to the inner walls. The sole condition to be respected is that said medium comprises or disengages gases or reducing and halogenised vapors in order to avoid premature exhaustion of the atmosphere released inside the parts by the cement according to the invention.

Said medium can be for example a halogenated-hydrogenated atmosphere, the outer walls then being exposed to a brightening stoving or to a diffusion deposition treatment, according to the constitution of the halogenated products of the atmosphere.

This can also be a cement for the treatment of a diffusion deposit by carrier halides, of which non-thixotropic cement the inert diluent and the metallic phase will if necessary be different from those of the thixotropic cement introduced into the parts to be treated.

In any case and whatever the features of the heat diffusion treatment, there must finally, once this heat treatment is carried out, ensue the removal of the cement occupying the inner cavity of the treated hollow part whereby said part has, on emerging from the operational method, its inner cavity completely freed and coated by a layer of surface diffusion alloy.

In certain simple cases, especially if the inner cavity of the part does not have sharp curves and if this cavity is open at its ends, the removal of the cement will be effectable by purely mechanical means by means of a suitable tool such as, for example a rotary brush.

It seems however preferable, in the majority of cases, to remove the cement by chemical means by injecting into the cavity containing said cement a solution of an acid capable of destroying the inert diluent and of driving out the residual metallic particles in the form of very dilute suspension.

Of course, the nature of the acid selected must take into the account the composition of the surface alloy formed on a wall of the cavity, and, especially, of the one or more metals or application alloys used.

Thus there can be used, in the case where the application metal is chromium and/or silicon, nitric acid, in the case where the application metal is chromium and/or aluminum, one of the acids, citric, tartaric, acetic, in the case where the application metal is tantalum and/or niobium, nitric acid or hydrochloric acid, and, in the case where the application alloy is chromium carbide, hydrochloric acid.

In the most usual cases the acid solution used will be an aqueous solution, but, if the cycle imposed on the solution is particularly long, it is better to use a solution of acid in an alcohol to avoid interfering attack phenomena.

The penetration of the acid solution into the cavity containing the cement is advantageously facilitated by placing said cavity under reduced pressure.

As for the circulation of the abovesaid solution it is preferably accelerated by pumping so as to reduce the duration of the cement removal treatment.

Lastly, there is advantageously a final rincing in distilled water in order to remove any trace of acid or of undesirable salt.

In any case, the hollow parts obtained have a surface condition of their inner cavity which is perfectly regular and homogenous.

It should be noted, in the general way, that it will be possible, according to the problems posed by the nature and destination of the metallic part treated, either to reserve the application of the treatment according to the invention to the inner wall of the part, or to apply in addition a further protective treatment, by diffusion of at least one application metal, to the whole or part of the outer wall of the part.

Besides, the method according to the invention can advantageously by applied to the treatment of the inner wall of previously brazed hollow metallic parts.

To illustrate the various features which have just been considered, there will now be given a certain number of specific examples having, of course, no limiting character.

Example I: Chromaluminisation of the inner wall of post combustion ramps of turbo-reactors Circular ramps of "Inconel" are concerned here, with a diameter of 25 to 100 cm constituted by a tube of inner diameter of the order of 7 mm pierced by numerous holes of a diameter of the order of 0.5 to 0.6 mm.

There is first prepared the basic cement by introducing, into a screw mixer, light calcined magnesia (800 g), ultra-fine magnesothermic chromium (400 g), aluminum in fine powder (85 g), magnesium turnings (12 g) and ammonium chloride (6 g).

A blank treatment of this mixture is then effected in a partly fluid-tight container in order to make the aluminum diffuse into the chromium, this blank treatment being conducted at 1080°C for 6 hours.

The preparation of the thixotropic paste is then carried out by placing the cement, previously cooled, in a ball grinder in which isopropyl alcohol (1200 cm$^3$) is added, oleic acid (10 g) and ammonium chloride (13 g), after 1 hour of grinding the paste is ready for use. It has the form of a thick cream which flows easily under vibration.

The ramps are then fixed on a vibrating table leaving their openings free and the paraffin inlet pipe connected to a vertical filling tube ending in a funnel.

The injection orifices are closed by an adhesive tape with the exception of two between those diametrically opposite the paraffin inlet pipe, after which the thixotropic paste is introduced in small amounts while the table is placed in vibration.

After about 10 minutes, the paste starts to spurt from the two orifices left free. The vibrations are then stopped, the adhesive tapes closing the other orifices are lifted off and the table is caused to vibrate again for some seconds until the paste emerges from the thus freed orifices, which constitutes the guarantee of good filling of the ramp.

The isopropyl alcohol is then removed by a stoving operation at 60°C for 48 hours followed by an additional stoving at 120°C for 24 hours.

The internal and external chromaluminisation treatment is then carried out by immersion of the ramp lined in a chromaluminisation cement where the diluent is alumina supplemented with 0.5% of ammonium chloride. The treatment is conducted for 15 hours at a temperature of the order of 1060° – 1065°C.

The thickness of the coating is then, internally and externally, of the order of 50 to 60 microns.

The outer parts of the ramp having been freed of all alumina cement by brushing, the orifices of the ramp are freed with a needle and the latter is dipped into a stainless steel tank filled with a solution of 200 g citric acid per liter. This solution is heated to 60°C, the paraffin pipe being connected to a water-pump in order to place the inside of the ramp under suction and thus to facilitate the penetration of the acid solution through the injection orifices.

After three hours the liquid of the vat is changed and it is checked that the acid solution is not filled with magnesia and remains clear and a last washing with distilled water follows, then drying of the ramp which is then ready for use.

Such a ramp is effectively protected against dry corrosion at high temperature and, in addition to and contrary to what happens with non-treated ramps, it does not give rise to interfering carbon deposits on the inner walls.

Example II: aluminisation of post combustion ramps of turbo-reactors

The same parts as in the Example I are concerned and procedure is as in the Example I with the slight difference that the constituent elements of the base cement are of light calcine magnesia (985 g), aluminum in fine powder (15 g) and ammonium chloride (6 g) the treatment in blank of the cement being conducted for an hour at 1080°C.

Example III: chromaluminisation of movable blades of turbo-reactors cooled by convection These blades are constituted of a nickel based alloy "IN 100" (Cr 10, Co 15, Mo 3, Ti 4.7, Al 5.5) and they have longitudinal channels of 0.6 mm diameter.

The base elements of the cement are light calcine magnesia (800 g), ultra-fine magnesothermic chromium (200 g), nickel from the carbonyl 3 microns (200 g), aluminum in fine powder (12.5 g) and ammonium chloride.

The formation of the cement and of the thixotropic paste is the same as in the Example I.

The filling on the vibrating table is effected from a trough molded of elastomer on a model blade.

The stoving is identical with that of Example I and the subsequent heat treatment is conducted for 14 hours at 1060° – 1065°C, the lined blades being immersed in a conventional chromaluminisation cement.

The removal of the cement after chromaluminisation is carried out by adapting a nozzle to the foot of the treated blade, by immersing this blade in a solution at 60°C of 200 g of tartaric acid per liter of water, and by proceeding with a suction, by means of a water-pump connected to the abovesaid nozzle, until complete freeing of the channels.

After which a washing and drying is carried out as in the Example I.

The thickness of the chromaluminised layer is 60 to 70 microns on the outside of the parts and 40 microns on the inside.

Example IV: chromisation of heat exchanges for gas turbines

These parts are formed by winding into a spiral two thin sheets (0.05 mm) of stainless steel 18 – 8, one of these metal sheets being corrugated to define channels having a section of 25 mm × 0.5 mm.

The base elements of the cement are light calcined magnesia (880 g), nickel from carbonyl 3 microns (140 g), ultra-fine magnesothermic chromium (260 g), magnesium turnings (5 g) and ammonium chloride (6 g).

The operation in blank for the formation of the cement is conducted for 6 hours at 1060°C and the preparation of the thixotropic paste is identical with that of Example I.

The filling of the part from the vibrating table is obtained by using a collar of rubber fixed at the upper end of said parts.

The stoving is effected as in Example I and the thermal treatment of diffusion is effected by immersion in a cement of a powder of composition identical with that which had served for the preparation of the thixotropic paste lining the inside of the parts, the abovesaid treatment being conducted at 1060°C for 5 hours.

The removal of the cement is effected as in the Example III but by replacing the tartaric solution by nitric acid diluted to one quarter.

The chromium content of the inner and outer surface parts is brought to about 30%, which confers on them a better resistance to dry corrosion.

Example IV bis

This example differs from Example IV by the composition of the cement base which is formed of light calcine magnesia (800 g), ultra-fine magnesothermic chromium (85 g) and ammonium chloride (6 g).

Example V: tantalisation of nickel coils for a heat exchanger by circulation of liquid sodium The constituents of the base cement introduced into the mixer are calcined light magnesia (800 g), the tantalum in fine powder (272 g), the ultra-fine magnesothermic chromium (56 g), the nickel from carbonile 3 microns (72 g), the magnesium in turnings (12 g) and the ammonium chloride (6 g).

The preparation of the cement and that of the paste is effected as in Example I.

For the filling of the coils, the latter are stood vertically on the vibrating table and equipped with an upper funnel into which the paste is poured until the latter emerges at the base of the coil.

Stoving is effected as in Example I and the coils are immersed, for the diffusion treatment, in a tantalisation cement having alumina as inert diluent.

The removal of the inner cement is effected by means of hydrocloric acid diluted to one tenth which is made to flow first by aspiration by means of a pump and, then, by means of a simple pump.

The washing and drying take place as in Example I.

Example VI: chromisation treatment limited to the inner wall of gun barrels

The tubes are lined with thixotropic paste prepared from a chromising cement and the parts thus lined are heated in a fluorine producing bright polishing atmosphere.

Example VII: chromisation of the inner wall of cracking tubes with simultaneous chromaluminisation of their inner walls These tubes of stainless steel, are filled with a thixotropic paste prepared from a chromising cement, the tubes concerned being then closed by means of stoppers enabling gaseous exchanges. The abovesaid tubes are then immersed in a conventional chromaluminisation cement and heated for 15 hours at 900°C.

After removal of the inner cement tubes are obtained of which the inner zones are enriched in chromium over a thickness of about 30 microns whilst the outer zones are enriched with chromium and with magnesium to a thickness of about 100 microns.

The chromisation ensures very good protection against sulfuation, whilst chromaluminisation ensures excellent protection against dry oxidation and intergranular fissuration.

Example VIII: internal chromisation of rotary brazed heat exchangers

These exchangers, of stainless steel, are produced by simultaneous winding of a corrugated sheet of stainless steel and of a flat sheet of the same material, these sheets being coated with a sheet of nickel and of phosphorus of thickness of about 10 microns.

The assemblies thus formed are heated for 20 minutes at 950°C in a reducing atmosphere fluorinated to equilibrium, which ensures at the same time the brazing of the contact zones of the two sheets and coating of the whole of the surfaces by molten braisure.

The parts are then chromised internally by means of a thixotropic cement with chromium-magnesium for 10 hours at 875°C, the later removal of the refractory diluent being effected by nitric attack.

The exchangers thus treated are insensitive to mechanical thermal fatigue and resist the effect of strongly sulphurated gases up to temperatures which can reach 700°C in continuous service.

Example IX: internal and external aluminisation of rotary brazed heat exchangers The treated parts are the same as in Example VIII but the final protective treatment consists of aluminisation at a moderate temperature (475°C) for 15 hours in the midst of a thixotropic cement based on aluminum in fine powder, magnesia and ammonium chloride.

The appearance of the surface of the parts and their resistance to saline corrosion and to dry corrosion are improved.

Example X

This Example differs from the preceding one solely in the fact that the outer envelope of the treated exchangers is constituted by a tube of previously chromised graphite, the brazing used being a chemical deposit of copper, followed by a deposit of silver.

We claim:

1. In a method of forming a surface diffusion alloy by applying at least one application metal to the inner wall of a hollow metallic part in which a cement comprising a powder of at least one application metal, an inert diluent having a high heat of formation to prevent coalescence or sintering of the particles of the application metal powder during formation of said surface diffusion alloy, and a halogen or halogenated compound for generating vapors of said application metal to the inner wall of the part to be treated, is introduced into the cavity of said hollow part in immediate proximity to said wall, and in which the cement is then heated to generate vapors of the application metal to form a surface diffusion alloy of the application metal and the metallic part at the inner wall of said part; the improvement which comprises:
providing in said cement a surface active agent selected from the group consisting of oleic acid, linoleic acid and ricinoleic acid in an amount sufficient to confer thixotropic properties on the cement such that the cement is temporarily liquefied when subjected to vibration,
subjecting the cement within said cavity, prior to heating the cement, to vibration to temporarily liquefy said cement to facilitate penetration of said cement into remote zones of said cavity to bring said cement into immediate proximity to said wall;
leaving the cement undisturbed within the cavity until it resumes its initial viscosity; and
after heating the cement to form said surface diffusion alloy, removing the cement from within the hollow part.

2. A method according to claim 1, wherein the treated hollow part, at least at the inner wall of its cavity, is constituted by at least one metal selected from the group consisting of iron, nickel, cobalt, tungsten and molybdenum.

3. A method according to claim 1, wherein at least the inner wall of the cavity of said part includes an additional metal selected from the group consisting of chromium, titanium, aluminum or zirconium.

4. A method according to claim 1, wherein the application metal is selected from the group consisting of chromium, aluminum, tantalum, tinanium, zirconium, vanadium, boron and alloys of these metals.

5. A method according to claim 1, wherein the surface active agent is present in a solution, the solvent thereof having a boiling point between 80° and 120°C.

6. A method according to claim 5, wherein the solvent is an aliphatic or aromatic hydrocarbon, or absolute alcohol.

7. A method according to claim 1, wherein the surface active agent is introduced into a mixing apparatus at the same operational stage as the other constituents of the cement.

8. A method according to claim 1, wherein introduction of the cement into the cavity is effected by simple gravity flow.

9. A method according to claim 1, wherein the introduction of the cement into the cavity of the treated part subjected to vibration is effected by injection.

10. A method according to claim 1, wherein the surface active agent is present in a solution and wherein the solvent is removed prior to forming said surface diffusion alloy.

11. A method according to claim 10, wherein the elimination of the solvent is effected by heating.

12. A method according to claim 11, wherein the heating is carried out in a first phase conducted at a temperature below the boiling point of the solution and a second phase conducted at a temperature above this boiling point.

13. A method according to claim 1, wherein the removal of the cement residue from the hollow part comprises introducing an aqueous or alcohol acid solution.

14. A method according to claim 1, wherein the application metal is one which forms a protective surface diffusion alloy on the wall of said part.

15. A method according to claim 1, wherein the outer wall of the part is provided with a surface diffusion alloy by heat treatment with a cement comprising said powder, said inert diluent, and said halogen or halogenated compound.

16. A method according to claim 15, wherein the cement used for the treatment of the outer wall is different from the cement used for the inner wall.

17. A method according to claim 15, wherein the cement used for the treatment of the outer wall is the same as that used for the treatment of the inner wall.

18. Hollow metallic part having a surface diffusion alloy formed by the method according to claim 1.

* * * * *